(12) United States Patent
Zhang et al.

(10) Patent No.: US 11,340,055 B2
(45) Date of Patent: May 24, 2022

(54) TAPELESS MEASURE GAUGE

(71) Applicants: Meng Zhang, San Clemente, CA (US); Yanchen Zhang, San Clemente, CA (US); Zhongyi Yang, Dongguan (CN)

(72) Inventors: Meng Zhang, San Clemente, CA (US); Yanchen Zhang, San Clemente, CA (US); Zhongyi Yang, Dongguan (CN)

( * ) Notice: Subject to any disclaimer, the term of this patent is extended or adjusted under 35 U.S.C. 154(b) by 377 days.

(21) Appl. No.: 16/779,635

(22) Filed: Feb. 2, 2020

(65) Prior Publication Data

US 2021/0239445 A1   Aug. 5, 2021

(51) Int. Cl.
*G01B 3/12* (2006.01)

(52) U.S. Cl.
CPC ...................................... *G01B 3/12* (2013.01)

(58) Field of Classification Search
CPC ........................................................ G01B 3/12
USPC .................................................... 33/772–782
See application file for complete search history.

(56) References Cited

U.S. PATENT DOCUMENTS

| | | | | |
|---|---|---|---|---|
| 3,191,310 A * | 6/1965 | Carlson | ..................... | G01B 3/12 33/781 |
| 3,769,711 A * | 11/1973 | Flournoy | ............... | G01C 22/02 73/49.5 |
| 4,372,049 A * | 2/1983 | Hogue | ..................... | B43K 8/00 101/328 |
| 4,573,131 A * | 2/1986 | Corbin | ..................... | G01B 7/34 73/105 |
| 5,036,598 A * | 8/1991 | Culling | ..................... | G01B 3/12 33/776 |
| 5,052,687 A * | 10/1991 | Katerba | ............... | G01C 22/004 473/150 |
| 6,889,444 B2 * | 5/2005 | Trout | ........................ | G01B 3/12 33/780 |
| 7,089,679 B2 * | 8/2006 | Brown | ..................... | G01B 3/12 33/775 |
| 7,111,412 B2 * | 9/2006 | Huang | ..................... | G01B 3/12 33/772 |
| 7,574,815 B1 * | 8/2009 | Lai | ........................... | G01B 3/12 33/772 |
| 8,516,708 B2 * | 8/2013 | Kildevaeld | ............ | B25G 1/007 33/780 |
| 9,482,508 B2 * | 11/2016 | Wojciechowski | ....... | G01B 3/12 |
| 9,964,390 B2 * | 5/2018 | Lai | ........................... | G01B 3/12 |
| 2022/0050941 A1 * | 2/2022 | Du | ......................... | G06F 30/20 |

* cited by examiner

*Primary Examiner* — George B Bennett
(74) *Attorney, Agent, or Firm* — Kwan & Associates; Stephen L. Z. Kwan

(57) ABSTRACT

The present invention relates generally to measuring lengths. Typically one would use a ruler or tape ruler to measure units of distance, and to measure surface area of objects of a variety of shapes and sizes. However, in existing technology when using a ruler or tape ruler one cannot measure objects with complex shapes and sizes such as objects with a curved path, curved shape or irregular shape. Therefore, this new invention of Tapeless Measure Gauge provides a handheld digital rolling measuring gauge in a single item solution to accurately measure such objects varying from a flat surface, to a curved surface or shape or irregular shape.

13 Claims, 3 Drawing Sheets

TAPELESS MEASURE GAUGE

PRIORITY DATE

Applicants claim priority date of Mar. 27, 2019 based on Chinese Patent filing date of Mar. 27, 2019. (Chinese Patent Approval dated Aug. 6, 2019, Patent #201920400280.3)

BACKGROUND OF THE INVENTION

Field of the Invention

This invention relates to a digital measurement system and more particularly to a handheld digital rolling measuring gauge utilizing a round rolling wheel capable of being operated using one hand to measure a linear distance. The invention is capable of such functions as calculating an area of a surface. The invention is also capable of measuring cubic dimension using a measured linear distance. The invention includes: a rotational measuring body, a rotational measure sensor, a digital display, a battery compartment, a circuit board, related electronic components. The gauge diameter is 50±10 mm. The main body includes a Rotational Bearing mounted on a Rolling Wheel. The mentioned digital display with related electronic components is mounted with an axle coupled with the Rotational Bearing. The rotational measure sensor is installed on the casing of said rolling wheel and rotates with the rolling wheel thereby calculating linear distance measurements.

Brief Description of the Related Art

In existing technology of measuring lengths, there is widespread use of rulers or tape rulers to measure units of distance, and to measure surface area of objects of a variety of shapes and sizes. However, in existing technology using a ruler or tape ruler one cannot measure objects with uneven surfaces or complex shapes and sizes such as objects with a curved path or curved shape or irregular shape.

Therefore, this new invention of Tapeless Measure Gauge provides a handheld digital rolling measuring gauge which will be a single item solution to measure such objects varying from a flat surface to a curved surface or uneven surface or shape, or irregular shape.

SUMMARY OF THE INVENTION

The purpose of this invention is to provide a new type of solution to measure such objects varying from a flat surface, to a curved surface or shape or irregular shape and improve the stability and accuracy of measurements.

This invention will overcome the typical problems of attempting to measure distances over surfaces of irregular shapes, irregular shapes, etc. Such surfaces cannot be accurately measured using a regular solid ruler or tape measure. This invention was made to overcome the problem that solid rulers and tape measures cannot accurately measure the actual surface area or distance of curved or irregular shapes.

This handhold digital rolling measuring gauge will be a solution to measure objects with curvy or irregular shapes.

During operation, the rotational moving sensor on the rotational rolling wheel is in communication with the fixed sensor on the axle. When the rotational rolling wheel is moving, the rotational moving sensor is signaling the fixed sensor which is mounted on the axle, the fixed sensor uses the signal to calculate the measured data, and display the measured value on the digital display. The accuracy of measurement is greatly increased by having the rotational rolling wheel take measurements while said rotational rolling wheel contacts with the entire length of the measuring surface.

This new Tapeless Measure Gauge is a handheld digital rolling measuring gauge which includes a digital display, a rotational rolling wheel, a gauge body, a rotational measuring sensor, a rotational bearing, circuit board, wherein said gauge body diameter is 50±10 mm, wherein said rotational rolling wheel, rotational measuring sensor, and said rotational bearing are coupled to said digital display unit though an axle; wherein said digital display is mounted on said axle; wherein said rotational measuring sensor is installed on said rotational rolling wheel and a fixed measuring sensor is installed on said axle and connected to said digital display; wherein said rotational measuring sensor is coupled to said fixed measuring sensor unit and said digital display are connected to and powered by a power supply such as a battery.

Figure 1:
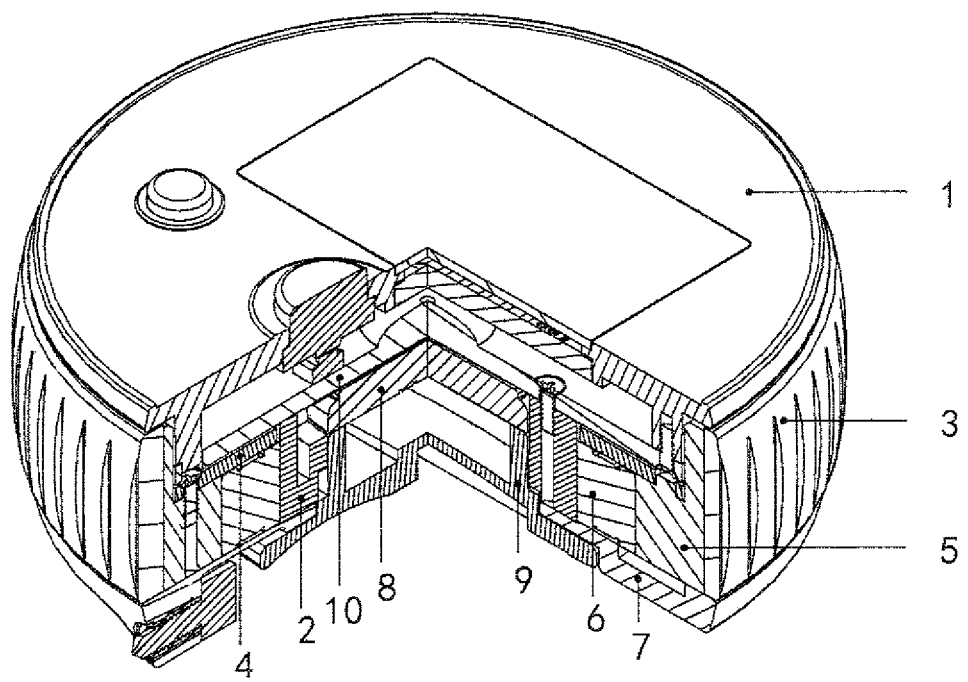
FIG. 1 shows the structural display provided by the invention.

The parts listed are:
(1) Digital display
(2) Axle
(3) Rotational rolling wheel,
(4) Rotational measuring sensor
(5) Rotational rolling wheel frame support
(6) Bearing
(7) Back cover
(8) Power supply
(9) Battery Cover
(10) Circuit Board

DESCRIPTION OF PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Referring to the drawing figures, like reference numerals designate identical or corresponding elements throughout the several figures as shown and described in FIG. 1 through FIG. 3.

FIG. 1 shows the structural display of the present invention including: (1) a digital display a rotational rolling wheel body, (8) power supply, and other components. Gauge body diameter is 50±10 mm; Gauge body includes: an (2) axle, including a rotational rolling wheel that is fitted on the axle; Measuring sensor unit includes: (4) a rotational measuring sensor, and a fixed sensor unit. The (4) rotational measuring sensor is mounted on the (3) rotational rolling wheel. The fixed measuring sensor is mounted on the (2) axle. The fixed sensor is mounted on the (2) axle is connected with (1) digital display. The (4) Rotational measuring sensor, the fixed measuring sensor unit, (10) Circuit Board and the (1) digital display are connected to the (8) power supply.

Figure 2:
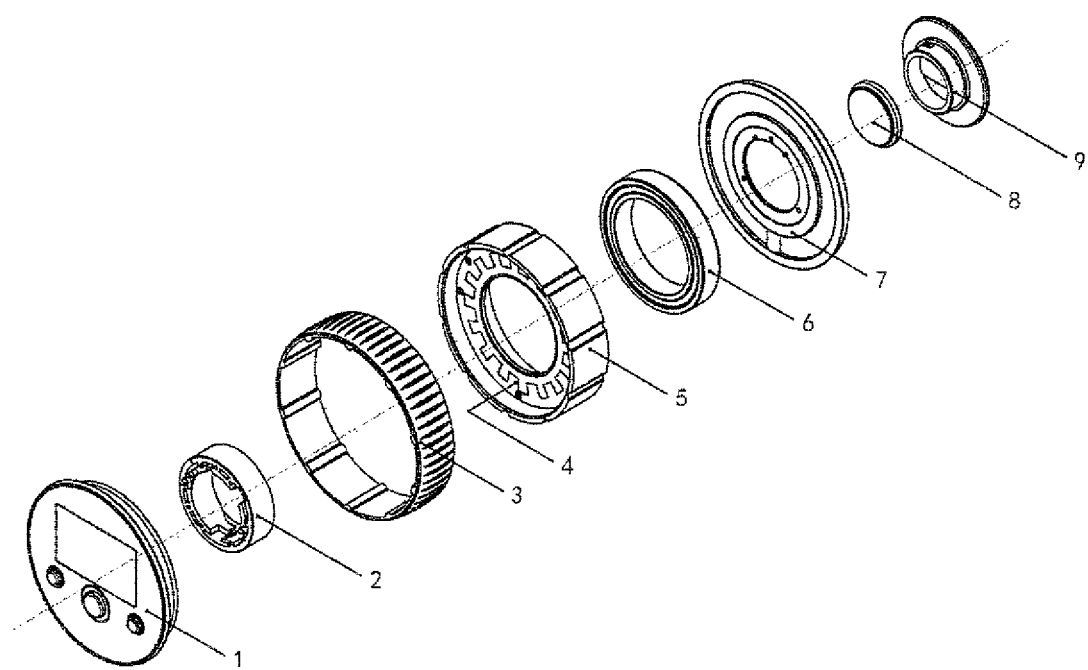
FIG. 2 shows the parts display provided by the invention.

FIG. 2 shows the parts display of the present invention showing the (2) Axle and rotational rolling gauge body are in a relative rotational relationship. The (4) rotational measuring sensor on the (3) rotational rolling wheel is in communication with the fixed sensor on the (2) axle. When the (3) rotational rolling wheel is moving, the rotational moving sensor is sending a signal to the fixed sensor which is mounted on the (2) axle which receives the signal. The fixed sensor uses the signal to calculate the measured data, and displays the measured value on the (1) digital display.

The (3) rotational rolling wheel is mounted on the (5) rotational rolling wheel frame support is installed on the (2) axle. All described parts are connected together into one handheld unit.

The (4) rotational moving senor is mounted on the (5) rotational rolling wheel frame support. Bearings are fitted between the (2) axle and (5) the rotational rolling wheel frame support allowing for rotation of (3) rotational rolling wheel.

For ease of assembly and installation, said (5) rotational rolling wheel frame support and (3) rotational rolling wheel are fixed in one main body part and said digital display and the axle are fixed in another main body part.

Said (8) power supply is a battery and is covered by said (9) battery cover.

Figure 3:
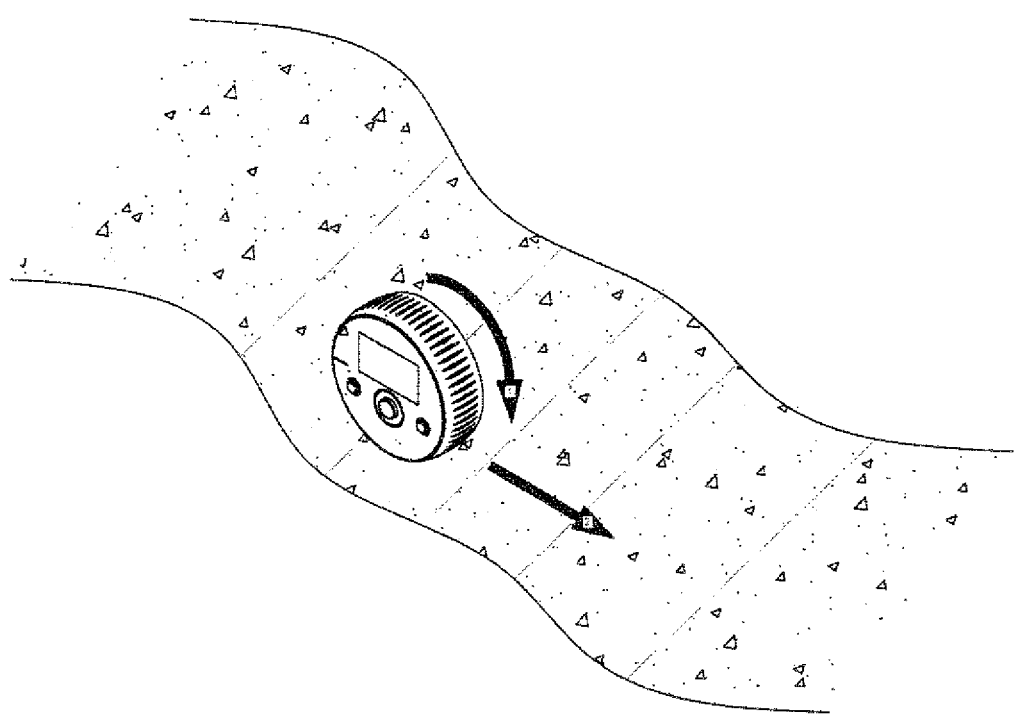
FIG. 3 shows the Tapeless Measure Gauge of the present invention measuring the length of a distance of an uneven surface with curves.

FIG. 3 shows another embodiment of the present invention, wherein the apparatus is measuring the surface area of a curved uneven surface.

In another embodiment of the invention the rotational rolling wheel is treaded to provide traction on the surface being measured when moving.

In another embodiment of the invention the tread is rubber.

In another embodiment of the invention, the battery for the power supply is replaceable.

In another embodiment of the invention, the batter for the power supply is rechargeable.

This handhold digital rolling measuring gauge will be the solution to measure objects with a curvy surface or shape which cannot be accurately measured using a regular ruler or tape ruler.

Also to be sure, in this manual, relations terminology, such as the first and the second, is only used to distinguish one entity from another entity or operation, and does not necessarily require or suggest that there is any actual relationship or order between these entities or any operation between. Also, the term "including" and "include" or any of its other variants is intended to cover a non-exclusive contain, which includes a series of elements of the process, method, item or equipment not only includes those elements, but also no clear list of other elements, or also includes objects is the process, method, or device inherent elements. In the absence of more restrictions, the statement "includes a . . . " is used. The elements of a finite element are not excluded from the process, methods, objects, or equipment contained in the elements.

Still other objects, features, and attendant advantages of the present invention will become apparent to those skilled in the art from a reading of the detailed description of embodiments herein, constructed in accordance therewith, taken in conjunction with the accompanying drawings.

What is claimed is:

1. A handheld digital rolling measuring gauge including: a digital display, a rotational rolling wheel, a gauge body, a rotational measuring sensor, a rotational bearing, a circuit board, wherein said gauge body diameter is 50±10 mm, wherein said rotational rolling wheel, rotational measuring sensor, and said rotational bearing are coupled to said digital display unit through an axle; wherein said digital display is mounted on said axle; wherein said rotational measuring sensor is installed on said rotational rolling wheel and a fixed measuring sensor is installed on said axle and connected to said digital display; wherein said rotational measuring sensor is coupled to said fixed measuring sensor unit and said digital display are connected to a power supply.

2. The handheld digital rolling measuring gauge of claim 1, wherein said rotational rolling wheel is coupled to a rotational rolling wheel frame support; wherein said rotational rolling wheel frame support and rotational rolling wheel are fitted onto said axle.

3. The handheld digital rolling measuring gauge of claim 2, wherein said rotational measuring sensor is mounted to said rotational rolling wheel frame support.

4. The handheld digital rolling measuring gauge of claim 2, wherein said rotational rolling wheel frame support is mounted inside said rotational rolling wheel.

5. The handheld digital rolling measuring gauge of claim 1, wherein said digital display unit is mounted in the front side of said axle.

6. The handheld digital rolling measuring gauge of claim 1, wherein said rotational rolling wheel includes tread for traction.

7. The handheld digital rolling measuring gauge of claim 1, wherein said power supply is a button battery.

8. The handheld digital rolling measuring gauge of claim 7, wherein said power supply is positioned in the center of said handheld digital rolling measuring gauge body, wherein said power supply provides power to all components requiring power.

9. The handheld digital rolling measuring gauge of claim 8, wherein said battery cover is in a shape proportional to slot for said battery and the battery cover and the battery compartment.

10. The handheld rolling measurement gauge of claim 9, wherein said rotational rolling wheel is treaded to provide traction on the surface being measured.

11. The handheld rolling measurement gauge of claim 10, wherein said tread is rubber.

12. The handheld rolling measurement gauge of claim 11, wherein said battery for the power supply is replaceable.

13. The handheld rolling measurement gauge of claim 12, wherein said battery for the power supply is rechargeable.

* * * * *